United States Patent [19]

Leumann

[11] Patent Number: 4,586,266
[45] Date of Patent: May 6, 1986

[54] HIGH PRECISION GAGING BLOCK
[75] Inventor: Hans E. Leumann, Washington, Pa.
[73] Assignee: Westinghouse Electric Corp., Pittsburgh, Pa.
[21] Appl. No.: 663,243
[22] Filed: Oct. 22, 1984
[51] Int. Cl.⁴ .............................................. G01B 3/30
[52] U.S. Cl. .................. 33/531; 33/DIG. 2; 33/534; 33/567; 33/168 R; 33/178 R
[58] Field of Search ............ 33/DIG. 2, 174 H, 173, 33/168 R, 178 R, 169 R, 174 S; 248/362, 363, DIG. 4; 269/21; 33/531, 534, 567, 573, 536, 537

[56] References Cited
U.S. PATENT DOCUMENTS

| 2,686,975 | 8/1954 | Geipel | 33/178 R |
| 3,109,242 | 11/1963 | Nyitrai | 33/174 S |
| 3,744,135 | 7/1973 | Gebel | 33/DIG. 2 X |
| 3,771,232 | 11/1973 | Specht | 33/174 H X |
| 4,320,580 | 3/1982 | Williams | 33/DIG. 2 X |

FOREIGN PATENT DOCUMENTS
1158719 12/1963 Fed. Rep. of Germany ........ 33/175

Primary Examiner—Harry N. Haroian
Attorney, Agent, or Firm—Thomas R. Trempus

[57] ABSTRACT

A device and a system for ascertaining dimensions includes at least one gaging block held by negative pressure to a workpiece. The gaging block has a body with a first face and a second face. The first face includes a recess portion therein and the second face defines a measurement reference surface. The body includes a port in communication with the recess portion and adapted for communication with a negative pressure generating device such as a vacuum pump. The gaging block is held by negative pressure in intimate and highly accurate contact with a workpiece in order to provide a reference point for measurements that might for a variety of reasons be most difficult to obtain.

10 Claims, 8 Drawing Figures

HIGH PRECISION GAGING BLOCK

BACKGROUND OF THE INVENTION

Field of the Invention

The invention relates to a technique for ascertaining measurements, more particularly, the invention provides an apparatus whereby a high precision gaging block is held by the application of negative pressure to a workpiece surface in order to provide a reference point or a reference plane for a measurement.

Quite often, a product or workpiece is of such a configuration as to render itself virtually impervious to conventional measurement techniques and devices. The precise measurements of such configurations can be quite difficult for any of a number of reasons including, for example, inaccessible surface area, sloped or curved surfaces, the lack of sufficient area for the application of a gaging apparatus or the fact that the act of measuring requires the proverbial "four hands".

It is therefore an object of this invention to provide a technique whereby a gaging block can be held firmly in place, against the element to be measured and regardless of the material from which the workpiece is constructed.

SUMMARY OF THE INVENTION

The invention is a system for providing a reference point and/or a set of reference planes for use in ascertaining dimensions. The system includes a negative pressure generating device and one or more gaging blocks held in intimate and accurate contact with the workpiece surface by negative pressure. The gaging block comprises a body with a first face adapted to conform to a workpiece surface. The first face also includes a recess portion therein. A second face of the body defines a measurement reference surface. The body includes a port in communication with the recess portion of the first face and adapted to be in communication with the negative pressure generating device. The gaging block is removably secured to the workpiece surface by the generation of a negative pressure in the recess portion as the first face rests against the workpiece surface. Alternative embodiments of the present invention include the features of a gasket or seal-like member disposed about the recess portion, multiple recess portions and a depth micrometer to provide gaging precision regardless of seal deflection. The distance or relationship between the first and the second face of the body has been generated to a high degree of accuracy in the manufacture of the block and is a known measurement, thereby preventing the introduction of errors into the dimension to be measured.

BRIEF DESCRIPTION OF THE DRAWINGS

The above as well as other features and advantages of the present invention can be appreciated through consideration of the detailed description of the invention in conjunction with the several drawings in which.

DESCRIPTION OF THE PREFERRED EMBODIMENTS

Figure 1:
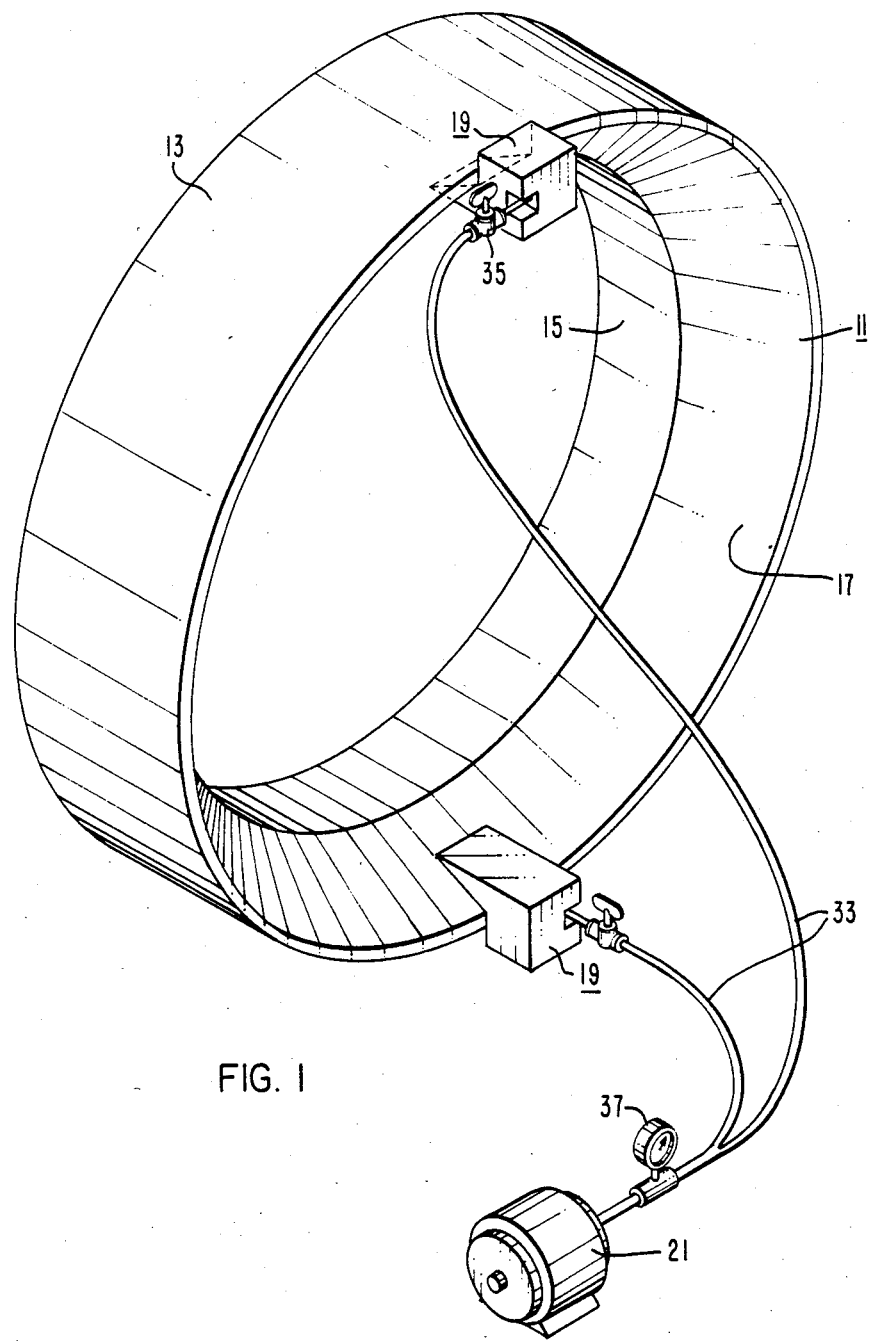
FIG. 1 is a perspective view of a cylindrical member with a conical surface onto which is mounted the high precision gaging blocks of this invention.
Figure 2:
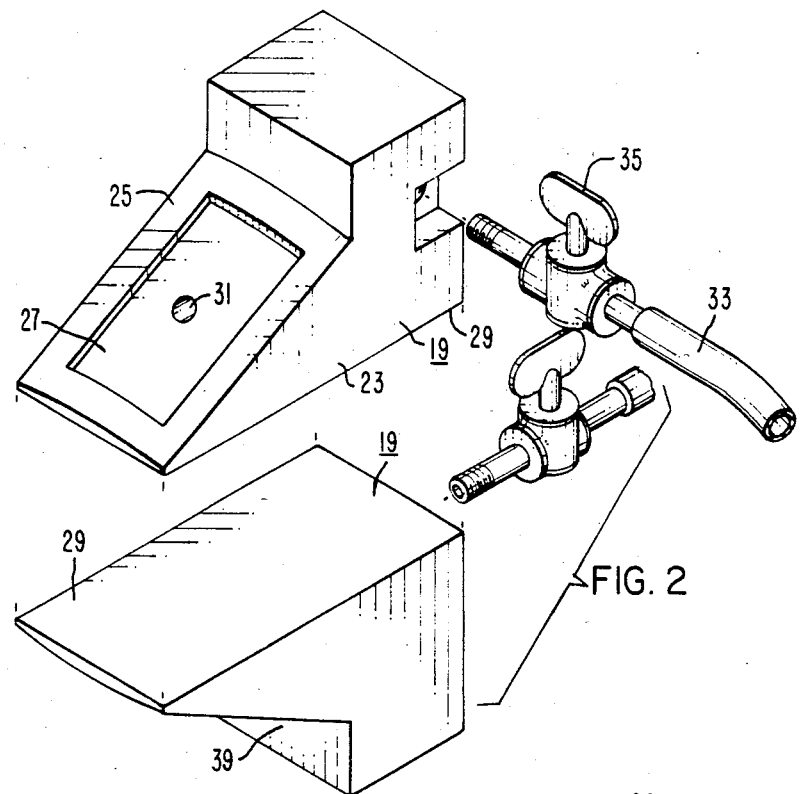
FIG. 2 is a perspective view of the gaging blocks and the technique by which measurements are ascertained, all according to the teachings of this invention.

The present invention provides a technique for ascertaining measurements. The invention provides an apparatus whereby a high precision gaging block is held by vacuum to a workpiece surface in order to provide a reference point and/or a set of reference planes or surfaces for measurements. Turning now to FIG. 1, a large generally cylindrical-shaped member indicated by the reference character 11 represents an object to be measured using the apparatus of this invention. The cylindrical object 11 has an outer surface 13, an inner surface 15, and a conical surface 17 which could typically not be measured accurately with conventional instruments. A gaging block according to this invention and indicated by the reference character 19 is disposed at the uppermost portion of the conical surface 17 and at the lowermost portion of the conical surface 17. Each gaging block 19 is firmly and intimately attachable to the surface to be inspected by means of a negative pressure generating device such as a vacuum generator 21. Turning now to FIG. 2, the vacuum-held gaging blocks 19 according to this invention are illustrated as being removed from the large cylindrical device to be measured so that the manner by which these gaging blocks are removably secured can be appreciated. The gaging block 19 comprises a body 23 having a first face 25 adapted to conform to the workpiece surface as at 17 of the object 13. The first face 25 includes a recess portion 27. Thus, the portion of the first face which surrounds the recessed portion as at 25, represents a seat by which the gaging block intimately rests against the surface to be measured. At least one additional face of the gaging block 19 defines a measurement reference surface 29. As will be described in detail below, a gaging block can include two or more reference faces. The body portion 23 of the gaging block 19 also includes port means 31 in communication with the recess portion 27. The port means 31 is adapted to be in communication with the negative pressure generating means 21. The aforementioned communication can be established by means of vacuum hoses 33 extending between the vacuum generator 21 and the gaging block vacuum port 31. Valve means 35 can be provided in the line 33 as can a vacuum gage 37 in order to monitor a level of vacuum being provided to the gaging block, thereby ascertaining the accurate location of the blocks. A low vacuum reading, caused by excessive leakage between the gaging block and the workpiece indicates a misplaced or misaligned gaging block.

The vacuum feature of the gaging block permits the gaging block to be firmly attached to an element or surface of a workpiece to be inspected, regardless of whether the workpiece is made of a magnetic or non-magnetic material. Once firmly in place, the gaging block provides either a reference surface, an attachment fixture, or if two blocks are being used as is the case illustrated in FIG. 1, a set distance which can now be measured with conventional devices is presented. The vacuum to hold the gaging block to the work surface can be provided by any number of means. A small vacuum pump as illustrated in FIG. 1, an air ejector, a water aspirator or the intake manifold of the engine of a forklift, a truck or a car can be used to provide the vacuum.

Considering both FIGS. 1 and 2, it can now be appreciated how the inside diameter of the outer edge of a conical surface can be accurately measured. With the vacuum held gaging blocks 19 in place directly opposite one another on the conical surface 17, two perfectly flat reference surfaces are provided for measurement purposes. An abutment 39 disposed adjacent the first face of the gaging block provides a reference point to ensure that the gaging block is properly referenced on the conical surface 17. Such an abutment or similar surface-like device ensures accurate and consistent location of the gaging block. Thus, the reference surface 29 of the diametrically located gaging blocks 19 provide the points between which a measurement is taken. This resulting measurement is the base figure to which is added a second measurement representing each gaging block. Each gaging block will have a high precision known dimension which must be added to the previously ascertained dimension in order to account for the offset created by the gaging block.

The first surface 25 of the gaging block can be custom made in order to conform exactly to a certain configuration, or curved to fit cylindrical or other curve surfaces. In the case in which a gaging block is made for use with one particular surface configuration, the known dimension each gaging block provides that must be added to the otherwise ascertained dimension represents a fixed value. Additionally, in a custom fit gaging block where metal-to-metal contact between the gaging block and the work surface is desirable, the proper placement of the gaging block can be determined by detecting any vacuum leakage between the workpiece surface and the gaging block. A vacuum gage in the system or directly associated with each of the gaging blocks can provide this information.

Figure 4:
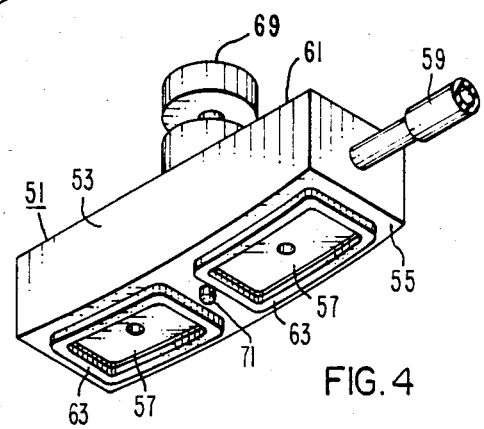
FIG. 4 is a perspective view of the alternative embodiment illustrated in FIG. 3.
Figure 3:
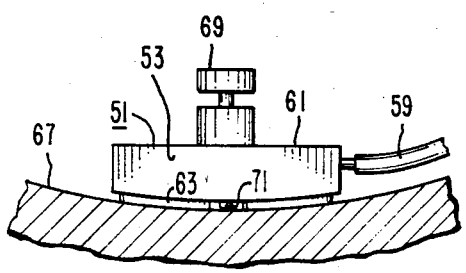
FIG. 3 is an elevational view of an alternative embodiment incorporating multiple recess portions, micrometer and seal-like members disposed about each recess portion.

Turning now to FIGS. 3 and 4, an alternative embodiment of the vacuum gage block of this invention is generally indicated by the reference character 51. This embodiment of the gaging block 51 is useful for straight inside diameter measurements. The gaging block includes a body portion 53 having a first face 55 which defines, in this case, two recessed portions 57. It is to be appreciated that while at least one recessed portion must be provided in the first face of a gaging block, it is, of course, possible to provide two or more such recessed portions for use in securing the gaging block to a given surface. A port means 59 is provided in the body portion and is in communication with the recessed portions 57 thereof. A second face 61 of the gaging block 51 provides the reference measurement surface. In order to provide a single gaging block which can accommodate a variety of radii, the gaging block 51 includes seal-like members 63 disposed about each of the recessed portions 57 in order to provide a good seat between the gaging block and the workpiece surface 67. Because this particular embodiment of the gaging block 51 is designed to accommodate a variety of workpiece surfaces, it is equipped with the additional feature of a depth micrometer 69. Mounted in the body 53 so that the ball tip 71 of the depth micrometer 69 extends from the first face 55 of the gage block, the micrometer can be adjusted in order to determine the exact additional dimension which must be added to account for the use of the gaging block in ascertaining dimensions.

Figure 5:
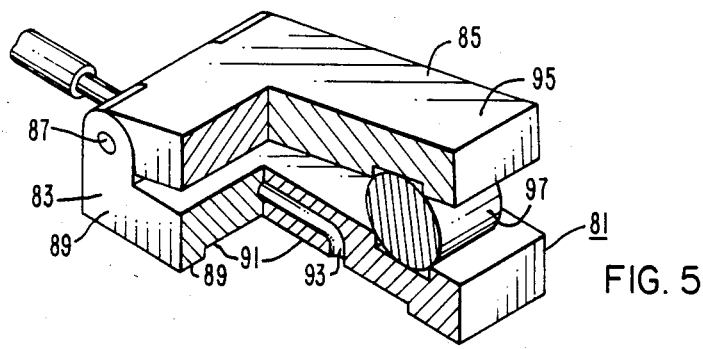
FIG. 5 is a perspective view of an alternative embodiment of the gaging block of this invention.

FIG. 5 illustrates an alternative embodiment for use with tapered surfaces. The gaging block 81 has a first body portion 83 and a second body portion 85 pivotably connected thereto by hinge means 87. The first body portion 83 has a first face 89 which defines the recessed portion 91. A vacuum port 93 is provided to establish communication between a vacuum pump and a recessed portion 91. The second body portion 85 includes thereon the second face or reference surface 95. Means such as the magnet 97 are included to maintain the second body portion in a fixed relation with the first body portion. In all other respects, the embodiment of the gaging block 81 functions identically to those previously-described embodiments.

Figure 6A:
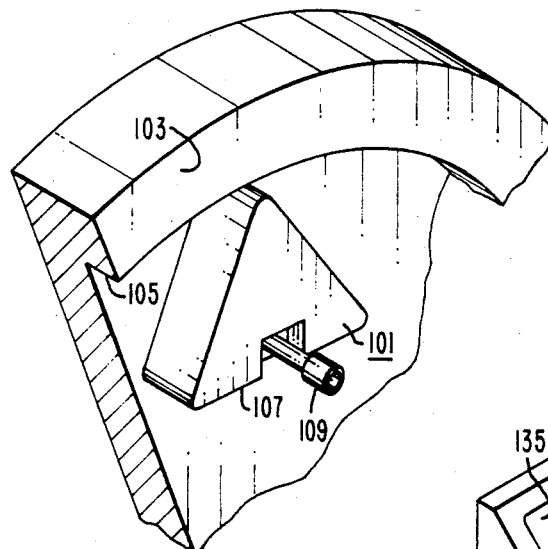
FIGS. 6A, 6B and 6C are perspective views of several gaging blocks designed to accommodate a variety of surface shapes.
Figure 6C:
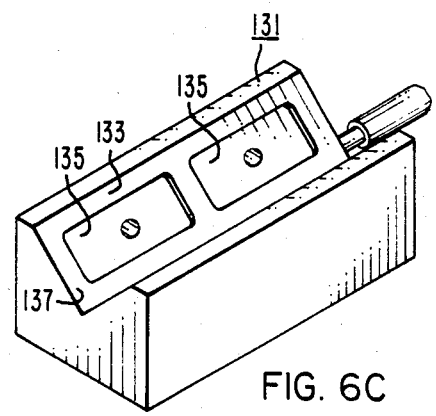
Figure 6B:
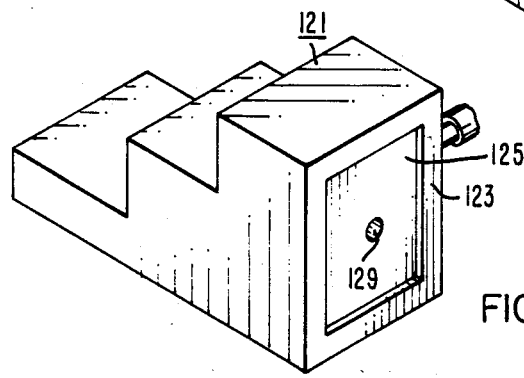

It is to be appreciated that the exact configuration of the gaging blocks illustrated herein, are provided as exemplars only and that the actual relationship of the reference surface of each gaging block relative to the face having the recessed portions therein can be modified to provide a virtually endless variety of gaging block configurations. FIGS. 6A, B and C are provided to show but three examples of gaging block configurations all according to the teachings of this invention. FIG. 6A shows a gaging block 101 which is useful in the measurement of a device 103 having an inside projection 105. The gaging block 101 is generally triangular in shape with one point of the triangle resting against the inside abutment to ensure proper gaging block location. The reference surface of the gaging block is defined by the second face 107. Vacuum port means 109 can be provided at any convenient location. The gaging block 121 of FIG. 6B illustrates that it is possible to provide multiple reference surfaces on a single gaging block. A first face 123 includes the recessed portion 125 and also illustrates the vacuum port means at 129. The remaining nine surfaces of the gaging block 121 can provide either singly or in combination, a reference surface for use in making measurements. FIG. 6C represents a gaging block 131 which includes a first face 133 having dual recessed portions 135 therein. The gaging block 131 provides a trough-like mounting portion as at 137 for contact with a workpiece requiring "V-block" fixturing. Any of the remaining surfaces of this gaging block can then function as a reference surface as necessary.

What has been described is a high precision gage block held by vacuum. Because the dimensions of the gage blocks are made to the highest precision and are known, the necessary additions or deductions for block elements or components are easy to calculate or adjust for when making final measurements. While the gage blocks can be made flat, they can also be made to conform exactly to a certain configuration or curved to fit cylindrical or other curved surfaces. Also, in order to provide a universal gage block to fit a certain range of radii, the gage block can be provided with an elastomeric seal or O-ring. This type of gage block with the sealing media can also be equipped with a depth micrometer of the type with a spindle to offset any inconsistency in a deflection of the seal. The outboard end of the spindle would be the reference surface and the ball-shaped inboard end of the micrometer would be in contact with the work surface.

I claim:

1. A gaging block for selective attachment to a surface of a workpiece comprising a body having a first body section and a second body section pivotably attached thereto, said first body section having a first face adapted to conform to the workpiece surface and including at least one recess portion disposed therein and a port means in communication with said recess portion and adapted to be in communication with a negative pressure-generating means wherein said first body section is removably secured to the workpiece surface by the generation of a negative pressure in said first face recess portion; and said second body section has a second face defining a measurement reference surface, wherein the measurement reference surface can be selectively, angularly positioned relative to the workpiece onto which said first body section is removably mounted.

2. The gaging block for selective attachment to a surface of a workpiece according to claim 1 wherein the first face includes a second recess portion therein, said two recess portions being in communication with the port means.

3. The gaging block for selective attachment to a surface of a workpiece according to claim 1 wherein a seal-like member is disposed about each of the at least one recess portions, said seal-like member facilitating a good seat and a determinable degree of compliance of said gaging block with the workpiece.

4. The gaging block for selective attachment to a surface of a workpiece according to claim 5 including means disposed between the first and the second body sections to maintain said body sections in a selected angular disposition.

5. A system for providing a reference point and/or reference planes for use in ascertaining dimensions comprising: a negative pressure generating means; and at least one gaging block having a body comprising a first body section and a second body section pivotably attached thereto, said first body section having a first face adapted to conform to a workpiece surface, said first face including a recess portion therein, and said second body portion having a second face defining a measurement reference surface, said first body portion also including port means in communication with said recess portion and adapted to be in communication with the negative pressure generating means; wherein said first body portion is removably secured to the workpiece surface by the generation of a negative pressures in said first face recess portion by said negative pressure generating means, and wherein the measurement reference surface can be selectively, angularly positioned relative to the workpiece onto which said first body section is removably mounted.

6. The system for providing a reference point for use in ascertaining dimensions according to claim 5 including hose means interconnecting the port means with the negative generating means such that the negative generating means is remotely located relative to the at least one gaging block.

7. The system for providing a reference point for use in ascertaining dimensions according to claim 5 including gage means disposed in communication with the hose means to reflect the value of the negative pressure being applied to the at least one gaging block.

8. The system for providing a reference point for use in ascertaining dimensions according to claim 5 wherein the first face includes a second recess portion therein, said two recess portions being in communication with the port means.

9. The system for providing a reference point for use in ascertaining dimensions according to claim 5 wherein a seal-like member is disposed about each of the at least one recess portions, said seal-like member facilitating a good seat of said gaging block with the workpiece.

10. The system for providing a reference point for use in ascertaining dimensions according to claim 8 including means disposed between the first and the second body sections to maintain said body sections in a selected angular disposition.

* * * * *